Oct. 3, 1967 D. B. MacLEOD 3,345,457

TENSION CONTROL FOR WIDEBAND RECORDING SYSTEM

Filed May 15, 1964 2 Sheets-Sheet 1

INVENTOR
DONALD B. MACLEOD

BY Robert G. Clay

ATTORNEYS

TENSION CONTROL FOR WIDEBAND RECORDING SYSTEM

Filed May 15, 1964

2 Sheets-Sheet 2

INVENTOR
DONALD B. MACLEOD

BY Robert H. Clay

ATTORNEYS

United States Patent Office 3,345,457

Patented Oct. 3, 1967

3,345,457

TENSION CONTROL FOR WIDEBAND RECORDING SYSTEM

Donald B. MacLeod, Redwood City, Calif., assignor to Ampex Corporation, Redwood City, Calif., a corporation of California Filed May 15, 1964, Ser. No. 367,811
13 Claims. (Cl. 178—6.6)

ABSTRACT OF THE DISCLOSURE

A magnetic tape tension control system for a wideband magnetic tape recorder/reproducer is described whereby compensation is achieved for tape tension variations during the reproduce mode that are different than those that existed during the record mode. Such compensation is accomplished through the combined use of a mechanical and an electronic servo system operating to control the rotation of the tape supply reel. The mechanical servo operates directly from the tension of the tape and the electronic servo operates from an error signal derived from the detected difference in the time of occurrence of successive recurrent pulses contained within the recorded signal information on the tape.

Figure 1:
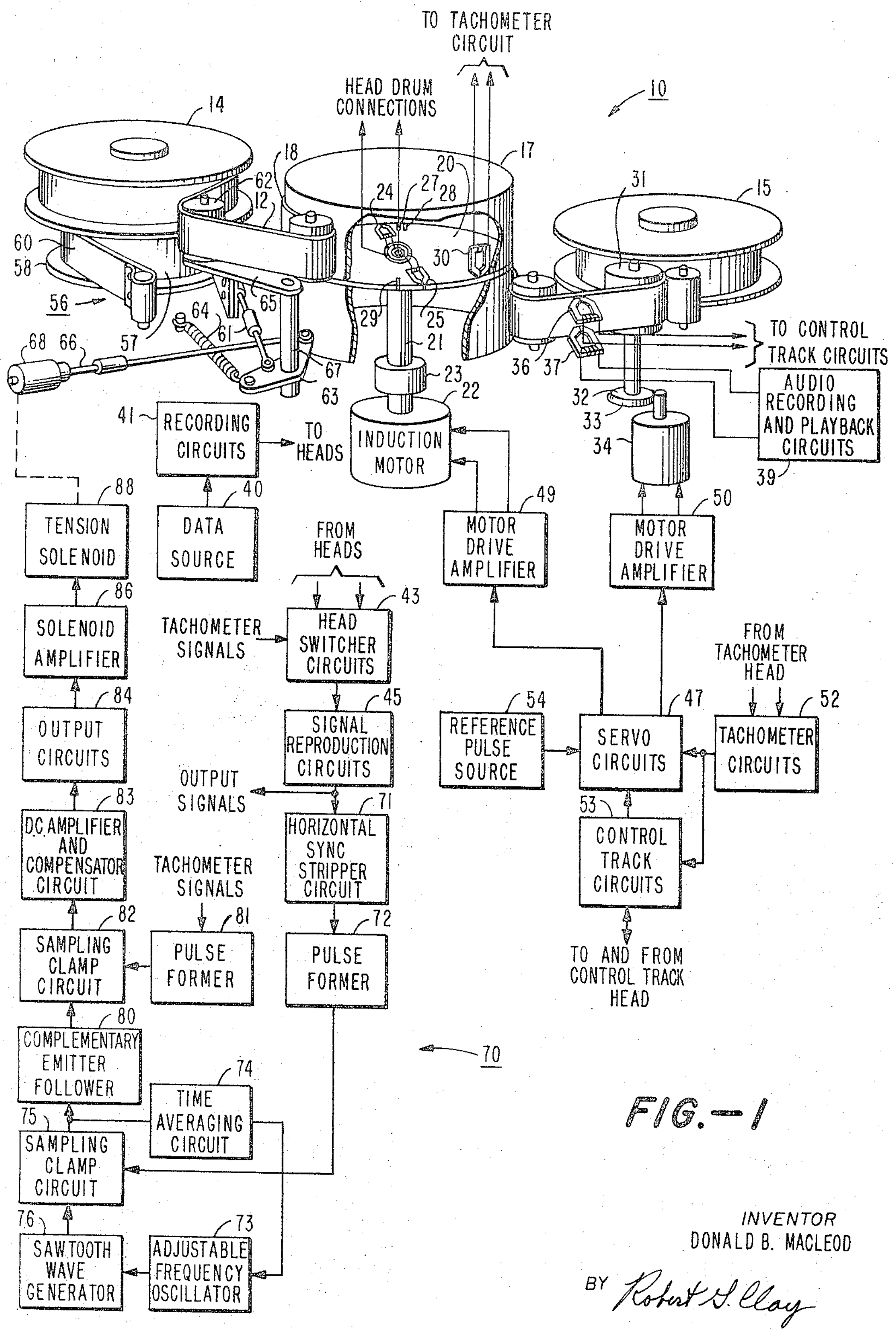

This invention relates to wideband recording and reproducing systems, and more particularly to means for adjusting and controlling the tension level in a record member.

Wideband recording systems for permitting storage and reproduction of digital data, television program material, and the like, usually employ a recording member, such as a magnetic tape, and means for scanning a magnetic head at a high speed relative to the tape. A high head to tape speed is necessary to encompass sufficient signal bandwidth within a single recording channel. While the tape itself may be run at high speed as the head is held stationary, it has been found preferable to utilize a scanning head assembly, such as a disk or drum, carrying one or more magnetic heads. As the tape is moved at a relatively slow speed past the head assembly, the heads themselves are moved in scanning fashion to provide record tracks disposed at some selected angle relative to the tape.

While these arrangements provide the necessary head to tape speed there remain a number of problems in achieving adequate control of the time base of the recorded and reproduced information. Obviously, an excessive instantaneous speed variation in digital data signals may cause data to be lost or distorted. Similarly, excessive time base variation within a line or within a frame of television program material may cause loss of synchronization or distortion of the reproduced picture in an objectionable manner.

One of the sources of distortion is the tension in the tape at the time of recording and reproduction. Tapes which are adequately strong and which have extremely thin (e.g. one mil) base materials are now in use. While such materials do not break in normal operation, they are stressed substantially within their elastic limits, so that varying dynamic conditions in the tape transport mechanism, as well as humidity and temperature variations, can result in tape stretching or shrinkage from a given nominal length. Variations in tape length in the region of the scanning head assembly may subsequently result in large variations in the time base of the recorded and reproduced material.

Tape tension or length variations are particularly troublesome in systems in which the angle of inclination of the recorded tracks is relatively low in relation to the longitudinal axis of the tape. Tension variations in such systems affect the recorded track lengths in substantially proportional amounts, in contrast to transverse track systems, in which only inter-track spacing is materially affected. Although the present tension system will be understood to apply also to fixed head systems, it finds its immediate utility in scanning head systems, which are currently in much wider use for television program recording and playback.

A particularly useful example of a wideband television recorder using tracks disposed at a relatively low angle to the longitudinal axis of the tape (and therefore particularly subject to tape tension and length variations) is found in the type of scanning head system in which the tape is passed in a helical path around a head drum cylinder. In such systems the tape is fed from a supply reel, helically wound and advanced about a split cylinder for an angle between 180° and 360°, and then passed onto a takeup reel. The scanning head drum, using one or two heads in the typical instance, rotates within an opening in the split cylinder to scan the tracks of the tape. The factors which cause length variations in the scanning region may be counteracted by the use of tension variations, but these variations should be introduced simply and without altering the operation or mechanism of the remainder of the system. A typical expedient in tape transport systems is to introduce a selected amount of tape tension in the region of the heads by using constant torque motors and employing a selected amount of friction in the tape path. It is feasible to vary the motor torque to vary tension, but considerable delay is usually encountered in effecting the tension adjustment by this means. In addition, such systems also dissipate considerable power and have relatively low mechanical gain, and therefore low sensitivity and response. Prior art systems also are largely unable to provide the combination of characteristics needed for both record and playback modes of operation.

It is therefore an object of the present invention to provide an improved tape tension control for wideband recording systems.

A further object of the present invention is to provide an improved control system for adjusting tape length in the scanning region of a scanning head type of tape recording and reproducing system.

A further object of the present invention is to provide an improved method of recording and reproducing television program material with a high degree of time base stability.

Yet another object of the present invention is to provide an improved form of wideband recorder, having superior time base stability.

These and other objects are achieved in accordance with the invention, through the use of a tape tension control system which operates a braking mechanism to adjust the tension in the tape. In a specific example of a television tape recorder, a predetermined tension level is automatically maintained during recording. During playback, time base variations in the horizontal synchronizing component in the recorded television signal are sensed to generate a tension error signal, the magnitude and polarity of which are representative of the tension error. This signal is then utilized to control the operation of an electro-magnetically actuated braking mechanism which adjusts the tension level in the scanning region. The braking mechanism provides a high mechanical gain system which operates with substantially no delay but with very low power requirements to adjust the tension level precisely. Additionally, the tension variations compensate for effects such as tape stretch or contraction due to humidity, temperature or like variations.

In a more particular example of a system in accordance with the invention, as applied to a television tape recorder and reproducer, the tape is maintained under constant tension in the record made by a closed loop tension arm system. On playback, the horizontal synchronizing pulses reproduced in the video from the tape are applied to an error signal generator circuit which includes a frequency controlled astable multivibrator nominally operating in a fixed frequency relation to the horizontal sync pulse repetition rate. The pulse series from the astable multivibrator is utilized to generate a sawtooth wave of like periodicity, which wave is applied to one input terminal of a sampling clamp circuit. The horizontal sync pulses are applied to the sampling input terminal of the same circuit. Pulse error signals are generated from the sampled sawtooth wave which represent in polarity and amplitude the deviation of the reproduced horizontal sync pulses from the flywheel reference. The error signal is time averaged and returned to a control input of the astable multivibrator to cause the multivibrator to follow the horizontal sync frequency with a selected response rate. Thus the astable multivibrator is operated in flywheel fashion, and follows the horizontal sync signal frequency throughout each field. As the system switches heads, however, a major deviation occurs, and a pulse output is derived which identifies the needed tension correction. This error signal is applied to a second sampling clamp circuit, the sampling times of which are controlled by pulses from a tachometer system coupled to the scanning head drum, and a DC output signal is derived which controls the level of tension introduced by a current energized braking mechanism which introduces a variable hold-back tension in the tape to compensate for tape tension errors. A feature of the invention resides in the use of a mechanical tension control in combination with an electrical tension control. In one form of such a system, the mechanical control is arranged to have a substantially higher frequency response than the electrical control, to provide a stabilized over-all characteristic. The mechanical control may utilize an arm in the tape path for sensing the tape tension, and coupled to the braking mechanism in a manner to introduce a force in opposition to the force introduced by the electrical control.

Figure 2:
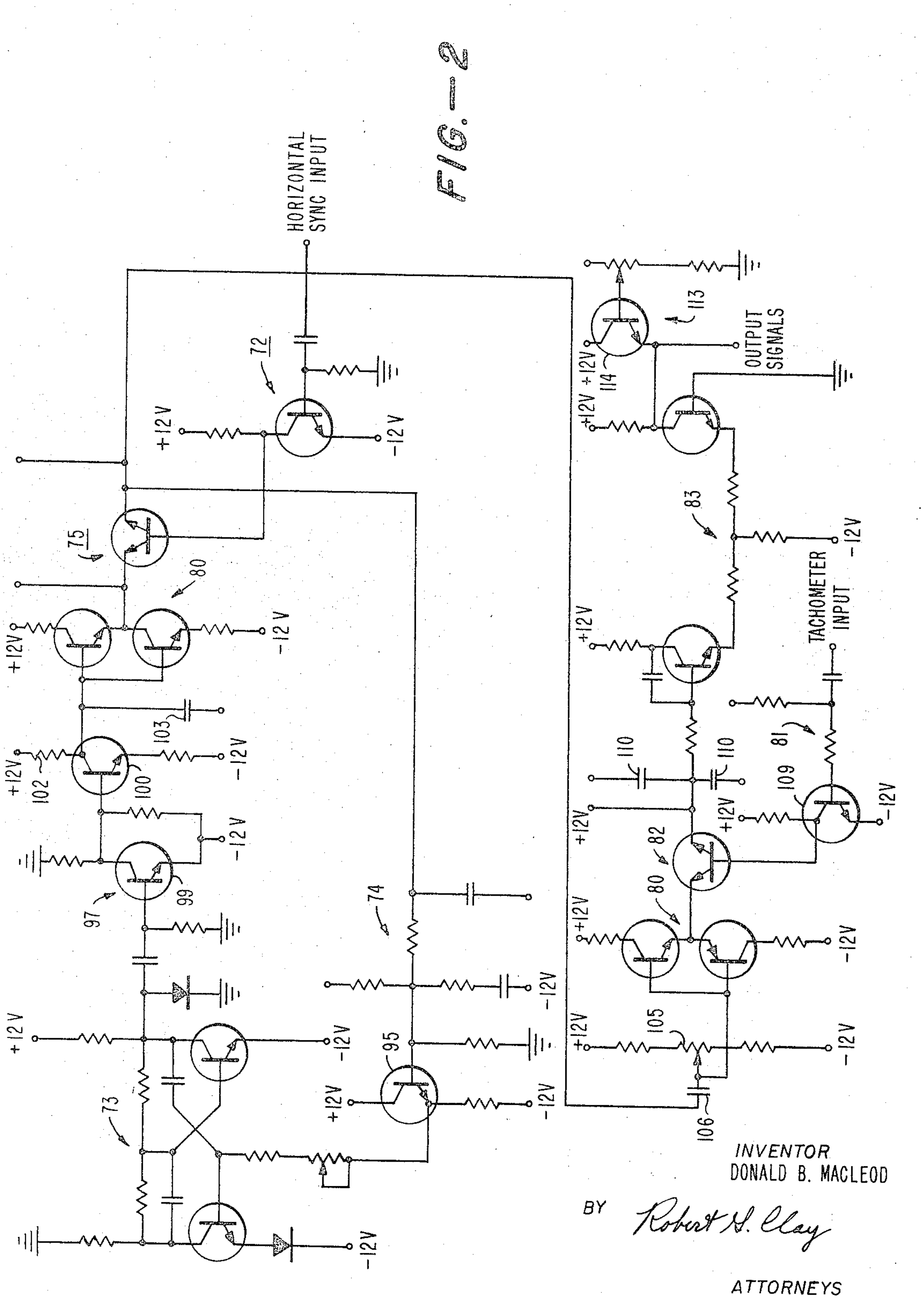

A better understanding of the present invention may be had by reference to the following description and the accompanying drawings, in which:

FIG. 1 is a perspective, partially broken away, representation of a tape tension control system for a wideband recording system in accordance with the invention; and FIG. 2 is a schematic circuit diagram of the elements of a control circuit which may be employed in accordance with the invention in the system of FIG. 1.

A wideband recording and reproducing system 10 in accordance with the invention, referring now to FIG. 1, may utilize a helical scanning head drum mechanism for recording and reproducing television program material. The invention will be described in this context, although it will be appreciated by those skilled in the art that the invention may also be used in digital and instrumentation recording systems as well.

In FIG. 1, a magnetic tape 12 is passed from a supply reel 14 to a takeup reel 15 and about an upstanding split cylinder 17. Guide rollers 18 and other guide mechanisms (not shown) confine the tape to a given wrap-around angle (here slightly in excess of 180°) about the cylinder 17, with the tape being disposed helically about the vertical central axis of the cylinder 17. The tape 12 is thus intersected by the central aperture in the split cylinder 17 at a slight angle (approximately 9°) in the system shown. Within this central aperture, a head drum 20 coupled by a shaft 21 to a head drum motor 22 through a compliant member 23 is rotated at a relatively high rate, such as 1800 r.p.m., with the drum diameter being selected for the desired head-to-tape speed (e.g. 1600 i.p.s.). Head-to-tape speed and the magnetic head gap are largely determinative of the bandwidth achieved. A pair of magnetic heads 24, 25 are mounted in the periphery of the head drum 20, and spaced 180° apart, such that each head 24 or 25 scans a helical track along the tape as the head drum 20 rotates at 30 revolutions per second. At this speed, and with selection of the proper angle of inclination of the helical tracks relative to the width of the tape, each track corresponds to a full television field. There is a selected amount of overlap interval between the adjacent tracks, so that for a time immediately prior to switching both heads are reproducing the same signal.

In order to insure that the switching time occurs in the blanking interval, means are required for indicating the instantaneous angular positions of the heads 24, 25. A set of magnetic elements 27–29 are used for this purpose, these elements being disposed in the head drum 20, with one element 27 being spaced 180° apart from the other closely spaced pair. A tachometer head 30 is positioned adjacent the path of the magnetic elements 27–29, and generates tachometer signals as the drum 20 rotates.

The longitudinal speed of the tape 12 is controlled by a capstan 31 that is driven through a flywheel 32 having a peripheral rubber rim defining a compliant member 33 and driven frictionally by the shaft of a hysteresis synchronous motor 34. A pinch roller assembly, shown only in simplified form, engages the tape 12 to the capstan 32, insuring positive drive of the tape.

A pair of heads are disposed adjacent the opposite longitudinal edges of the tape 12. A control track head 36 is coupled to control track circuits as described below, and an audio head 37 is coupled to audio recording and playback circuits 39. The television signals to be recorded are provided from a data source 40 through recording circuits 41 to the heads 24, 25 on the head drum 20, the connections being completed through a conventional ring and brush assembly (not shown in detail). Reproduced signals from the heads are applied to head switcher circuits 43 that are controlled by the tachometer signals. The recombined signal from the head switcher circuits 43 is applied to the signal reproduction circuits 45.

The various speed controls for the relatively fast moving head drum 20 and the relatively slow moving capstan 31 operate to insure that the television picture information is properly recorded in each track, and that the heads precisely scan these tracks on playback. A number of different expedients may be utilized, including an arrangement in which the capstan 31 is driven from a speed stable source during both record and playback, and the necessary speed corrections are made by servo control of the head drum 20 alone. In another arrangement, such as the one shown, the servo circuits 47 operate in response to the various input signals to generate error signals for controlling both the head drum motor 22 and the capstan motor 34 through appropriate motor drive amplifiers 49 and 50 respectively. The three principal inputs to the servo circuits 47 are the timing signals from the tachometer circuits 52, the timing signals from the control track circuits 53 and a reference signal from a reference pulse source 54. The latter source may comprise conventional studio synchronizing signal means.

The operation of systems as thus far described is well understood by those skilled in the art, but is here reviewed for full understanding of tension control systems in accordance with the present invention. When operating in the record mode, signals from the data source 40 are coupled to the heads 24, 25 on the head drum 20 as it rotates at 30 c.p.s. Concurrently, the tachometer head 30 reproduces signals from the magnetic elements 27, and these are applied to the tachometer circuits 52 as representative of actual speed and instantaneous position of the head drum 20. During record, the output signals from the tachometer circuits 52 are also applied to the timing control track circuits 53, and a timing signal is generated which is recorded at the control track head 36. At the same time, audio signals may be recorded at the audio head 37. The servo circuits 47 compare the time relationship of the signals from the tachometer circuits 52 to those from the reference pulse source 54 and generate an appropriate error signal for the head drum motor 22. Because of the placement of the magnetic elements 27–29 and the heads 24, 25 and because the magnetic elements 27–29 are distinctively disposed, the tachometer circuits 52 provide a timing signal which indicates the phase as well as the instantaneous angular position of the magnetic heads 24, 25. A time stabilized or other control signal is applied to the capstan motor drive amplifier 50, so that the tracks are recorded with proper spacings on the tape 12.

During playback, the signals from the control track head 36, representative of the actual position and speed of advance of the tape 12, are compared to the signals representative of head drum speed and position from the tachometer circuits 52. Again, the head drum 20 is driven, relative to the capstan 31, so as to cause the heads 24, 25 to scan along the previously recorded tracks, with a speed corresponding to the speed maintained during recording.

It will now be evident that variations in tape tension have serious effects both upon the time base of recorded and reproduced signals, and upon the disturbing errors which are introduced at switching times. Assume, for example, that the tape tension has suddenly increased substantially above its nominal value, and that the tape wrapped about the head drum has therefore been correspondingly lengthened. The time error in the reproduced signal is small from line to line, but is cumulative over a field, so that the error follows a sawtooth function, with a cycle time corresponding to that of the television field. The abrupt transition in the sawtooth occurs at the switch ing time. Although the head drum servo system can make time base corrections for the line to line variations by changing head drum speed, the accumulated error at switching time cannot be reduced in this manner, but only by tension changes. The length variations in the track are a substantial fraction of the length variations in the tape itself, because of the relatively low angle of inclination of the tracks to the longitudinal axis of the tape 12.

Another important disturbing effect occurs at head switching intervals. The 180° displacement of the heads 24, 25 is constant, but variations in tape tension cause shifts in the relative positions of the overlap intervals at the start and end of each recorded track. Thus, when the tape is at its nominal length one head 24 will be reproducing the same signal as the other head 25 at the switching time during the overlap interval. If the tape 12 shortens or lengthens, however, there is a time disparity between the signals reproduced, and the greater this time disparity the greater the time base correction which is needed immediately following switching. Moderate tension variations cause raster wobble and raster bend because of the abrupt shift of the time base on switching. Larger tension variations cause loss of synchronization at the associated picture display equipment.

Tape tension errors may of course result from variations in ambient temperature and humidity. They may also result, however, from variations in any of a number of system parameters, including dimensional tolerances, tape and component wear, and typical dynamic variations. Accordingly, it is highly desirable to be able to control the tape tension, and therefore the tape length in the vicinity of the head drum. Specifically, it is desirable to be able to maintain the tension substantially constant during record, and to modify the tension in a compensatory fashion on playback. The compensation means must minimize existing time base and switching errors without introducing its own errors, and without adding to the complexity of the existing tension regulation device.

Systems in accordance with the invention may utilize, as shown in FIG. 1, servo control of a braking mechanism coupled to the supply reel 14. The supply reel 14 is driven in normal fashion, but is subjected to a variable braking force from a braking mechanism 56 including a brake liner 57 which is disposed about a hub 58 on the supply reel 14. A brake band 60 is coupled to a link member 61 which in turn is pivotally mounted on a pivot lever 63. One extension of the lever 63 is lightly mechanically biased in a direction to tend to loosen the brake band 60 by a spring 64. The spring 64 is of light force, and is primarily used to disengage the system for loading and threading operations. The other extension of the pivot lever 63 is coupled by a link member 66 to the piston of a solenoid actuated plunger 68. The piston, which is not shown in detail, can be held at selected axial positions within the plunger 68, by the application of an energizing current of appropriate amplitude. The basic tension introduced in the tape by the plunger 68 is modified by changes of position of a roller 62 mounted on a sensing arm 65 that pivots with a shaft 67 coupled to the pivot lever 63. The arrangement is such that any increase of tension in the tape tends to cause the arm 65 to pivot in a clockwise direction (as viewed from above), relieving the tension of the brake band 60 and its frictional engagement with the brake liner 57. For a given setting of the link member 66, this mechanical arrangement forms a closed loop system which acts to stabilize tension. In a practical system it was found advantageous to use a response of the order of 10 c.p.s. Further details of the mechanical aspects of such a device are shown in a co-pending application for patent, assigned to the assignee of the present invention, and entitled "Tape Tension Device," filed Aug. 23, 1963 and having Ser. No. 304,168, now U.S. Patent No. 3,235,200. While the arrangement shown and described in that application is of particular benefit, it will be realized that other variable tension mechanisms may be utilized as well.

Control signals for the braking mechanism 56 are derived by utilizing the timing pulses occurring within the reproduced data, in the form of horizontal synchronizing pulses, and also by utilizing the tachometer signals from the tachometer circuits 52. Error signal generating circuits 70 derive the horizontal sync component from the television signal through use of a horizontal sync stripper circuit 71 which may be conventional. Sampling pulses are generated by use of a pulse former circuit 72. As the tension and tape length vary, the pulse repetition rate of the horizontal sync signal varies correspondingly and controls the sampling of signals from a variable frequency oscillator device 73 in the error signal generating circuit 70. While the variable frequency oscillator device 73 may take a number of different forms, it is preferred to utilize a flywheel type circuit, for reasons which will be apparent from the discussion of the specific circuits of FIG. 2. Thus, the adjustable frequency oscillator 73 receives the output signal derived from a first sampling clamp circuit 75 through a time averaging circuit 74. This completes a closed electronic loop, because the signal from the oscillator 73 is fed to the sampling clamp circuit 75 through a sawtooth wave generator 76. In response to sampling pulses from the pulse former 72 and the sawtooth wave, the clamp circuit 75 generates a pulse waveform error signal representative of the tension condition. When averaged in the circuit 74, the error signal provides a control for the adjustable frequency oscillator 73, matching the oscillator frequency to the horizontal sync signal.

The pulse waveform error signal is then provided to a complementary emitter follower circuit 80, and the pulses are again time sampled in a second sampling clamp circuit 82. The sampling times are controlled by the tachometer signal through pulses generated by a pulse former circuit 81. The output signal is averaged and a substantially DC level signal is derived and then supplied through a DC amplifier and compensator circuit 83 to output circuits 84. The output signal energizes a solenoid amplifier 86 which controls the position of the piston in the solenoid actuated plunger 68. This arrangement provides a variable tension control of an electronic nature, operating to adjust the braking mechanism in accordance with pulse-to-pulse time base fluctuations in the horizontal sync signal. It is preferred in a practical system to operate this loop with a response of approximately 1 c.p.s., or approximately an order of magnitude slower than the mechanical loop.

As the tape tension varies, therefore, the relative time displacements of successive horizontal synchronizing pulses also vary. The pulse-to-pulse changes are small, and so the oscillator 73 frequency is shifted to correspond closely throughout almost all of each field. At each switching time, however, the large time base deviation results in a corresponding momentary large error signal from the first sampling clamp circuit 75, before the oscillator 73 again stabilizes at the incoming horizontal sync rate. These switching time error pulses occur at the transitions in the tachometer signals because each field is recorded on a separate track. Therefore, when the tape tension is at its desired nominal value, such that the horizontal sync pulses are reproduced at 15,750 c.p.s., the output signal from the first sampling clamp circuit 75 is substantially constant at its reference level. When the tension shifts, however, a pulse waveform is generated from the flywheel circuit. The flywheel circuit quickly corrects in frequency for the minor variations between successive horizontal sync pulses within a field, but experiences a major deviation at each switching time, or 60 times per second. The pulse sequence at 30 c.p.s. derived from the tachometer signals is also averaged to convert the flywheel error signal to a corresponding DC level, for control of the oscillator 73. After a second sampling under control of the tachometer signals in the sampling clamp circuit 82, a DC output signal is derived from the wave forming and amplifying circuits 83, 84, and 86 to energize the tension solenoid 88, thereby appropriately modifying the tension on the supply reel 14. The length of tape in the scanning area at the head cylinder 17 is altered in corresponding fashion. This tension variation is extremely precise, but is so arranged as to remain substantially constant for any given tension setting. Furthermore, the amounts of power which are required are very low, being only that needed for the braking action on the tape supply reel. In a practical system, the time error between successive television fields is maintained at less than 0.2 microsecond pulse-to-pulse.

The electronic and mechanical closed loops cooperate to insure proper tension control during record, and superior compensation of tension errors during playback. During record, an operator may control energization of the solenoid by adjustment of a potentiometer (not shown). The sensing arm 65 arrangement then stabilizes tension at this setting. On playback, both the electronic and mechanical systems are used. The electronic closed loop system, which corrects tension errors, has a relatively slow response (e.g. less than 1 c.p.s.) in order to maintain a high signal-to-noise ratio and to avoid introduction of additional high frequency tension jitter. The system, however, may tend to have a strong resonant point because of reel inertia and tape compliance. This resonance is suppressed because the mechanical loop at a response of greater than 10 c.p.s., adds substantial damping to the system.

A specific example of tension control circuits in accordance with the invention is provided by the circuits shown in the schematic diagram of FIG. 2, in which functional units corresponding to the blocks of FIG. 1 have been similarly designated. These circuits are intended for use in a wideband recording and playback system using a head drum having two heads and operating at 30 revolutions per second. In addition, the blanking interval in the television signal which is recorded is placed in the overlap interval so that each head scans a track corresponding to a television field. The system also utilizes a head drum tachometer device by which a square wave is generated suitable for controlling head switching both as to time and the particular head which scans a given track.

One input signal to the circuits of FIG. 2 consists of the horizontal sync pulses derived by the horizontal sync stripper circuit 71 (FIG. 1) from the reproduced composite television signal and having a nominal frequency of 15,750 cycles per second. The signal is applied to a pulse former circuit 72 which includes a differentiating input circuit and a normally conducting transistor which is driven by the differentiated pulses to generate a rectangular pulse of predetermined duration in response to each applied horizontal sync pulse. The rectangular pulses are used as sample pulses to control the sampling times of the first sampling clamp circuit 75, as described below.

The adjustable frequency oscillator 73 is a conventional astable multivibrator device, having a pair of cross-coupled active elements such as transistors, and having a control terminal in one of the cross-couplings, to which control signals may be applied to vary the frequency of the oscillator 73. The oscillator 73 here is chosen to have a nominal frequency substantially twice that of the frequency of the horizontal sync pulses, or approximately 31,500 c.p.s. The signals provided from the sampling clamp circuit 75 to control the frequency of the oscillator 73 are derived from a time averaging circuit 74 including a passive input network for integrating the input signals applied to an emitter follower amplifier 95. The time averaging circuit 74 is selected to have a time constant which is somewhat greater than the normal cycle interval of the frequency controlled oscillator 73. Thus, individual pulse variations in the pulse error waveform which is derived from the sampling clamp circuit 75 are time averaged, and the operation of the oscillator 73 is stabilized relatively quickly as to each line. For a given television field, therefore, the oscillator 73 runs phase locked to the incoming horizontal sync signal. However, its response is predetermined by the time constants of the time averaging circuit 74. Thus it does not respond immediately to instantaneous time changes in the incoming sync signal, but instead averages these time errors. The flywheel error signal is thus a pulse sequence at the switching frequency (60 c.p.s.).

The output signal from the oscillator 73 is a rectangular pulse waveform of variable repetition rate which may of course have a wide disparity between the duration of the positive-going portions and the negative-going portions of the wave. It is desired to denote each complete cycle by an individual wave for subsequent sampling, so that the output wave from the oscillator 73 is applied to a pulse former 97 which includes a clipping diode 98, an input differentiating circuit and a transistor amplifier 99. The spaced positive-going output pulses from the pulse former 97 are supplied to a sawtooth generator 76 that includes a normally non-conducting transistor 100 that is coupled to a passive circuit including a resistor 102 and a capacitor 103. Each positive-going pulse from the pulse former 97 drives the passive circuit negative by discharging the capacitor 103 in a linear fashion through the transistor 100, which acts as a constant current device. Between applied pulses, the passive circuit is effectively coupled to the positive source connected to the collector of the transistor 100, and charges rapidly to a positive peak.

The sawtooth wave thus generated is applied to the complementary emitter follower 80, for impedance conversion and applied to one input of a bidirectional solid state switch which serves as the first sampling clamp 75. The remaining input signal is derived from the pulse former 72 which receives the horizontal sync pulse, and which controls the sampling times of the first sampling clamp circuit. Thus, at specific times in ascending particular portions of the sawtooth wave the brief sampling pulses are applied to effectively open the bidirectional switch 75. A series of output pulses are generated which are representative of the then existing levels of the sawtooth wave. Although the sawtooth wave has twice the frequency of the sampling pulses, this has no effect upon the sampling action or the generation of the error signal, because this merely means that every other pulse is sampled. In like manner, synchronous sampling will be undertaken if the multivibrator frequency is equal to, or some other multiple of, the horizontal sync rate.

As previously described, the output signal from the first sampling clamp circuit is a series of error pulses at the 15,750 c.p.s. rate. It should be noted here, however, that the effective output signal is actually a series of pulses at a 60 cycle per second rate, represented by the envelope of the pulses at the higher rate. The time averaging circuit 74 and the oscillator 73, together with the sampling circuits maintain the oscillator 73 phase locked to the incoming horizontal sync signal, except at the switching point between fields. Thus, on a line-to-line basis, the reproduced horizontal sync signal has relatively little deviation and the oscillator 73 operates in a synchronous manner without difficulty. As the scanning heads switch from recorded track to recorded track, however, the previously mentioned large time base deviation at the switching point is introduced. Consequently, there is suddenly a relatively large displacement in the pulse-to-pulse spacing of the horizontal sync signal, and a large error signal is generated at the sampling clamp circuit. With a two-head scanning drum system which records one field per track, these major excursions occur 60 times per second. Although they are quickly corrected, the resultant error signal apepars as a 60 c.p.s. pulse train. This pulse train is averaged in the circuit 74 for the oscillator 73 but is applied directly to the second sampling clamp 82 and the associated circuitry. The signal is first applied to a centering circuit 105 through a coupling capacitor 106, the centering circuit comprising an adjustable voltage divider. The signal is then applied as an input pulse to a complementary emitter follower 80 and thereafter coupled to one input terminal of the second sampling clamp circuit 82. This sampling action is undertaken under the control of the tachometer pulses, which are provided as a 30 c.p.s. square wave and applied to the input terminal of a pulse former 81. The input differentiating circuit of the pulse former 81 and the active element comprising a transistor 109 cooperate to provide sampling pulses at the 30 c.p.s. rate in correspondence to each negative-going edge of the applied square wave. The output error signal, at the 30 c.p.s. rate, is coupled to peak storage capacitors 110 and then applied as a DC input signal to DC amplifier and compensator circuits 83, which may here comprise an emitter coupled differential amplifier chain. The error signal which is applied to the solenoid amplifier 86 of FIG. 1 is passed through output circuits 84 which may include a limit clamp 113 in the form of a transistor 114 coupled as an emitter follower and having a selected bias level input signal.

The operation of the system of FIG. 2 utilizes the flywheel effect provided by the time averaging circuit 74 which responds to the first sequence of sample output pulses to control the oscillator 73. The resultant pulse sequence derived because of the time base error at the switching times is applied as a 60 c.p.s. signal to the second sampling circuit. In this circuit, the time relationship of the tachometer signal to the first error signal is caused to sense the error signal. The second sampling provides, as previously described, a final conversion of the 60 c.p.s. flywheel error signal to a DC control signal of proportional amplitude.

While a number of variable frequency systems may be employed for generating an error signal from the excursions of the horizontal sync pulse, the present system has particular utility, in that a special synchronizing signal source for tape tension is not required. Instead, the line-to-line stability of the horizontal sync pulses throughout the given television field is effectively utilized, but only the major excursions at switching times are utilized to control the tension. The system operates to provide constant tension during record, and compensatory tension variations during playback, with excellent time base stability.

While a number of variations of tape tension control systems and circuits have been described, it will be appreciated that the invention is not limited thereto. Accordingly, the invention should be considered to include all variations and modifications falling within the scope of the appended claims.

What is claimed is:

1. A system for correcting tension errors in a television signal reproducing system, comprising: tape supply and takeup means, tape drive means, controllable braking means coupled to the tape supply means, means responsive to reproduced signals for extracting horizontal synchronizing signal components therefrom, variable frequency oscillator means having a nominal frequency substantially corresponding to a multiple of the frequency of the horizontal synchronizing signal components, signal comparison means for generating an error signal in response to the time relation of signals from the variable frequency oscillator means and the horizontal synchronizing signal components, and coupled to control the variable frequency oscillator means, and means responsive to the error signal and coupled to the controllable braking means for varying the amount of tape tension introduced thereby.

2. A system for correcting tension errors in a magnetic tape television signal reproducing system, comprising: means associated with the tape in a scanning region for reproducing television signals therefrom, means responsive to reproduced television signals for extracting selected synchronizing signal components therefrom, controllable means coupled to the tape for introducing variable amounts of tension thereto, variable frequency oscillator means having a nominal frequency integrally related to the frequency of the selected synchronizing signal components, means responsive to the phase relation between signals from the variable frequency oscillator means and the synchronizing signal components for adjusting the variable frequency signal, and means responsive to the phase relation variations for operating the controllable tension means.

3. A system for correcting tension errors in a wideband magnetic tape recording and reproducing system using scanning heads comprising: tape drive means for advancing the tape past a scanning region, tape supply means feeding the tape to the tape drive means, a braking member frictionally engaging the tape supply means, current energized means coupled to control the braking member, means coupled to the scanning heads for extracting a selected synchronizing signal component from the reproduced signals, means responsive to the synchronizing signal components for generating an error signal representative of pulse-to-pulse variations therein, means responsive to the error signal for controlling the energization of the current energized means, mechanical means for sensing tension variations in the tape, and means responsive to the means for sensing, for introducing tension variations in the tape in a sense opposite to that introduced by the current energized means.

4. The invention as set forth in claim 3 above, wherein the current energized means provides a closed loop system having a response time substantially slower than the means introducing tension variations in an opposite sense.

5. A system for correcting tension errors in a television signal reproducing system comprising: first means for driving a tape, second means disposed apart from the driving means for exerting a controlled variable hold-back tension on the tape, third means disposed between the first and second means for reproducing signals from the tape, and fourth means responsive to changes in the time base of the reproduced signals for operating said second means.

6. A system for controlling the tension in a magnetic tape in the signal reproducing region of a magnetic tape reproducing system comprising: means spanning the signal reproducing region for exerting a controllable and variable tension on the tape, means for extracting a high frequency timing signal, the signal having a selected nominal frequency, from the reproduced signal, flywheel oscillator means providing a reference signal having a predetermined relationship to the timing signal, means for comparing the time relationship of the timing signal to the reference signal, and generating an error signal, the comparing means being coupled to apply the error signal to the flywheel oscillator means, and means for operating the means for exerting a controlled tension in response to the error signal.

7. A system for correcting tension errors in a magnetic tape television signal reproducing system, comprising: means associated with the tape in a scanning region for reproducing television signals therefrom, controllable braking means for exerting a variable hold-back tension on the tape, current energized means coupled to control the braking means, means responsive to pulse-to-pulse time base variations in the horizontal synchronizing pulses in the reproduced television signals, for energizing the current energized means in response thereto, and mechanical means responsive to tension variations in the tape, and coupled to urge the braking means in a sense opposing variations in the tape tension.

8. A system for correcting tension errors in the record member of a wideband reproducing system comprising controllable means exerting a hold-back tension on the record member, first control means responsive to time base variations in reproduced signals for operating the controllable means to introduce a variable tension level in the record member, the first control means having a selected relatively low response rate, and second control means responsive to tension variations in the record member for operating the controllable means to introduce an opposing tension variation in the record member, the second control means having a response rate substantially an order of magnitude higher than the selected response rate.

9. A system for correcting tension errors in a television signal reproducing system using a scanning head drum wherein each recorded track stores an individual television field, the system comprising: tape supply and take-up means, tape drive means, controllable braking means coupled to the tape supply means, means responsive to reproduced signals for extracting horizontal synchronizing signal components therefrom, flywheel oscillator means including a control input and having a nominal frequency substantially corresponding to twice that of the horizontal synchronizing signal components, signal comparison means receiving the signal from the flywheel oscillator means and the extracted horizontal synchronizing signal components, and comparing the time relation of corresponding pulses therefrom, to generate an error signal, time averaging means receiving the error signal and coupled to the control input of the flywheel oscillator means to control the frequency thereof, means receiving the error signal and coupled to provide a DC control signal, and means responsive to the DC control signal and coupled to the controllable braking means for varying the amount of tape tension introduced thereby.

10. A system for correcting tension errors in a signal reproducing system, the signals from which contain recorded time base components, comprising: tape drive means including controllable means for introducing a variable amount of tension in the tape, means responsive to the recorded time base components in the reproduced signals for generating timing signals therefrom, flywheel oscillator means having a nominal frequency which bears a fixed relation to the frequency of the time base components, signal comparison means responsive to the signal from the flywheel oscillator means and to the time base component in the reproduced signal for generating an error signal representative of the time relation thereof, means coupling the error signal to control the flywheel oscillator means, and means responsive to the error signal and coupled to the means for introducing variable tension to control the same.

11. A control system for correcting tension errors in a television signal reproducing system, the system including means scanning a record member in timed relation to individual television fields, and the control system comprising: record member drive means including controllable means for introducing a variable amount of tension in the record member, means responsive to reproduced signals for extracting horizontal synchronizing signal components therefrom, means responsive to the horizontal synchronizing components for sensing the extent of pulse-to-pulse time variations occurring between the end of one field and the start of the next, and means responsive to the sensing means and coupled to operate the controllable means for compensating for tension variations in the record member.

12. A system for correcting tape tension errors in a wideband recording and reproducing system which includes a head drum scanning the tape at a relatively low angle to the longitudinal axis of the tape, comprising: head drum means positioned at a tape scanning region, means coupled to the head drum means and responsive to signals reproduced from the tape for extracting timing signals therefrom, tape supply means positioned at one side of the tape scanning region, tape drive means positioned at the opposite side of the tape scanning region, controllable braking means coupled to the tape supply means, means responsive to the timing signals for providing an error signal representative of major pulse-to-pulse time base variations in the timing signals, and means operating the braking means in response to the error signal.

13. A system for controlling the tension and length of a magnetic tape in a head scanning region during reproduction, the recording system operating a scanning head drum at a relatively low angle relative to the longitudinal axis of the tape, the scanning head drum having a pair of oppositely disposed heads and including tachometer means providing a tachometer signal representative of head drum instantaneous angular position, the system comprising: means responsive to the reproduced television signals for extracting horizontal synchronizing signal components therefrom, flywheel oscillator means having a control input, and a nominal output signal frequency which is twice that of the nominal frequency of the horizontal synchronizing signal component, sawtooth wave generator means responsive to the output signal from the flywheel oscillator means, a first sampling clamp circuit coupled to receive the horizontal synchronizing signal components and to provide an output error signal representative of the time relation of individual horizontal synchronizing signal components to the corresponding portion of the sawtooth wave, such that a pulse output having major excursions at 60 cycles per second is generated, time averaging means coupled to receive the pulse output and to control the frequency of the flywheel oscillator means to maintain the frequency substantially like that of the horizontal synchronizing signal components throughout the majority of a television field, a second signal clamping circuit coupled to receive the pulse output from the first signal clamping circuit and the tachometer signals, the tachometer signals controlling the sampling times, such that a second output pulse error signal at 30 c.p.s. is generated, output signal from the output of the second sampling clamp means, and braking means exerting a controllable hold-back tension on the tape in advance of the scanning region, the braking means being controlled by the DC error output signal.

References Cited

UNITED STATES PATENTS

| | | | |
|---|---|---|---|
| 2,985,396 | 5/1961 | Johnson | 318—7 |
| 3,235,200 | 2/1966 | Sperry | 242—75.44 |

JOHN W. CALDWELL, *Primary Examiner.*

H. W. BRITTON, *Assistant Examiner.*